April 21, 1959 W. F. NEWBOLD 2,882,727
ELECTRICAL RATE OF FLOW MEASURING APPARATUS
Filed Oct. 21, 1954

INVENTOR.
WILLIAM F. NEWBOLD
BY Arthur H. Swanson
ATTORNEY.

United States Patent Office 2,882,727
Patented Apr. 21, 1959

2,882,727

ELECTRICAL RATE OF FLOW MEASURING APPARATUS

William F. Newbold, Chestnut Hill, Pa., assignor to Minneapolis-Honeywell Regulator Company, Minneapolis, Minn., a corporation of Delaware Application October 21, 1954, Serial No. 463,644

3 Claims. (Cl. 73—231)

A general object of the present invention is to provide an improved apparatus for measuring or regulating the speed of rotation of a rotatable member. More specifically, the invention is concerned with the use of a magnetic drag cup assembly in a new and improved electrical measuring, exhibiting and/or control apparatus.

Magnetic drag cup mechanisms are widely used for measuring the speed of rotation of a rotating member. These drag cup mechanisms generally take the form of a rotating magnetic member which rotates near an electrically conducting non-magnetic member or drag cup. The rotation of the magnetic member near the drag cup induces therein eddy currents which react with the magnetic field to produce motion of the drag cup or non-magnetic member. The non-magnetic members or drag cups are frequently calibrated in terms of speed so that a visual indication of the speed may be made directly by observing the motion of the member.

In some types of controls, it is desirable to determine the speed of operation of a rotating member and produce a speed signal that may be utilized for remote indication or for control purposes. The present invention is directed to means for utilizing a drag cup in this capacity to produce a control signal which may be used remotely for measuring or control purposes and which control signal will be accurate and stable.

It is therefore a further object of the present invention to provide an improved electrical measuring apparatus employing a drag cup mechanism to produce an electrical control signal which varies in accordance with the speed of operation of a rotating member.

Stability may be attained in apparatus of the present type by providing a closed loop circuit which includes the drag cup mechanism. The stability of the control signal in the present invention is achieved by using a drag cup mechanism which is effective to produce a force which varies in accordance with the speed being measured where that force is arranged to be balanced by an opposing force which may be induced by electromagnetic means.

Employing these novel principles, there has been devised an improved form of flow measuring apparatus as well as an apparatus for regulating the speed of operation of a motor which may in turn be used to drive a pump which establishes the flow.

Is is therefore a more specific object of the present invention to provide an improved apparatus for measuring the flow of a fluid in a conduit.

Another more specific object of the present invention is to provide an improved flow measuring apparatus which will produce an output control signal which varies proportionally with the flow being measured.

A further object of the present invention is to provide an improved flow measuring apparatus which utilizes a drag cup mechanism to determine the rate of flow of fluid in the conduit where the drag cup mechanism will produce an electrical signal which may be used to force balance an electrical force produced by the operation of the drag cup mechanism.

A still further object of the present invention is to provide an improved control apparatus for a variable speed motor where that control apparatus employs a drag cup mechanism which is effective to be used to regulate the speed of the motor.

The various features of novelty which characterize the invention are pointed out with particularity in the claims annexed hereto and forming a part of this specification. For a better understanding of the invention, its advantages, and specific objects attained with its use, reference should be had to the accompanying drawings and descriptive matter in which there is illustrated and described preferred embodiments of the invention.

Figure 1:
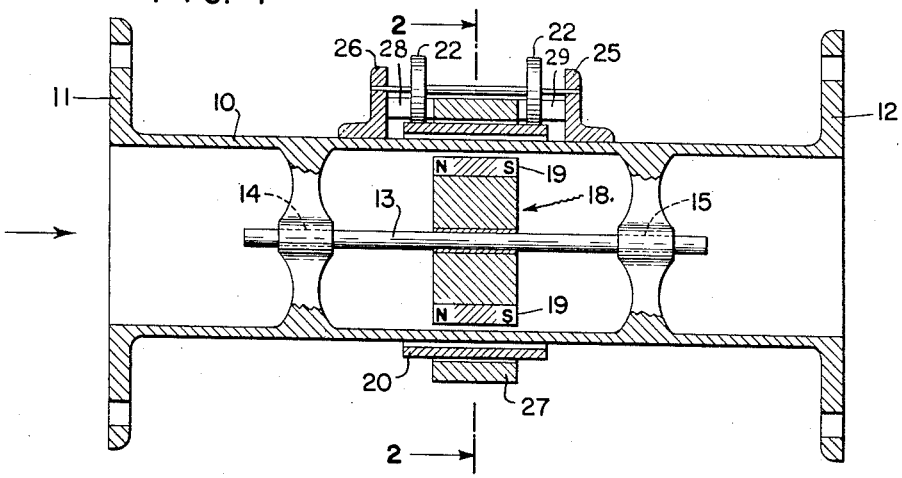
Fig. 1 represents a cross-sectional view of a flow measuring apparatus employing the principles of the present invention.
Figure 2:
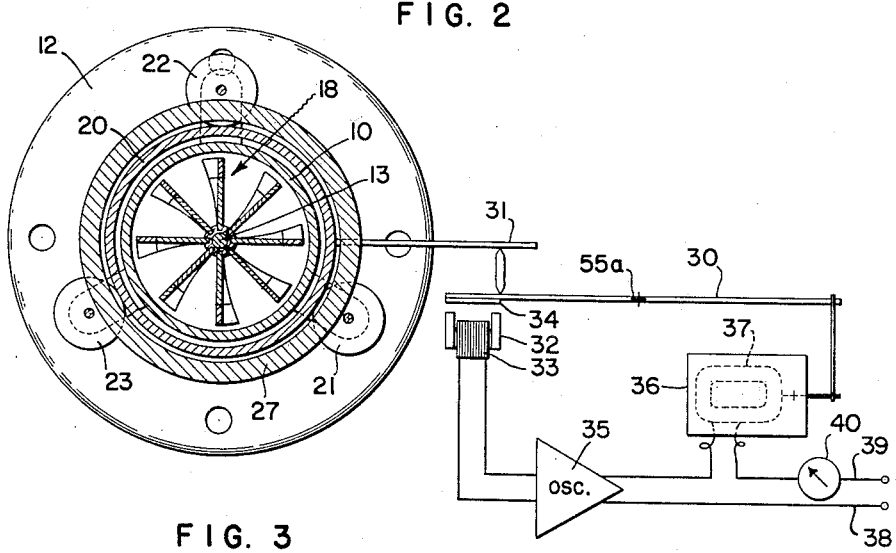
Fig. 2 shows an end view of a portion of the apparatus of Fig. 1 in combination with a force balancing mechanism.

Referring first to Figs. 1 and 2, the numeral 10 represents a conduit conducting a fluid the rate of flow of which is to be measured. The conduit 10 may be made of any suitable non-magnetic, highly resistive material such as non-magnetic stainless steel or ceramic, and have flanges 11 and 12 on either end thereof to provide suitable connecting means for fastening the conduit section 10 into a flow line. Rotatably mounted within the conduit 10 is a shaft 13 which is suitably journaled in bearing members 14 and 15 at either end thereof. Carried by the shaft 13 is a propeller mechanism 18, said propeller mechanism being arranged to be rotatably driven by the flow of fluid through the conduit 10 past the propeller mechanism 18. Mounted in the ends of the individual blades of the propeller mechanism 18 are permanent magnets 19.

Mounted externally of the conduit 10 is a drag cup element 20. The drag cup 20 may be formed of a suitable electrically conducting non-magnetic metal such as copper or aluminum. The drag cup element 20 may be mounted circumferentially about the conduit 10 and evenly spaced therefrom by a plurality of rotatable bearing units 21, 22, and 23 or some other suitable supporting means having low friction. These bearings units may be carried by suitable support members such as the support members 25 and 26 which are fastened to the surface of the conduit 10. Also carried by the support members 25 and 26 is a soft iron ring 27 coupled thereto by yoke members 28 and 29. The soft iron ring 27 provides a flux return path and field defining means for the flux from the magnets 19.

Included with the basic flow measuring apparatus of Fig. 1 is a force balancing mechanism shown in detail in Fig. 2. This force balancing mechanism comprises a pivoted beam 30 which has one end thereof connected to the drag cup element 20 by means of a member 31 which is rigidly fastened to the edge of the cup element 20. For detecting the motion of the pivoted beam 30 there is provided an iron core structure 32 having a coil 33 wound thereon with the air gap of the core 32 being variable by a member 34 which is carried by the end of the beam 30. This motion detecting mechanism is a part of an oscillator-amplifier 35 which is adapted to produce an output current proportional to the motion of the member 34 relative to the core 32. The oscillator and amplifier 35 has an output current which flows through a force balancing unit 36, the latter of which includes a coil 37 movable in a magnetic field, not shown. This beam motion detecting and force balancing unit may well take the form of the apparatus disclosed in the copending application of William J. Popowsky, Serial No. 442,264, filed July 9, 1954, now Patent No. 2,847,625.

In considering the operation of the apparatus of Figs. 1 and 2, it should first be noted that when there is a fluid flowing through the conduit section 10, the flow will cause the propeller mechanism 18 to rotate at a rate which is proportional to the rate of flow of fluid through the conduit. As the propeller mechanism 18 rotates, the permanent magnets in the tips of the individual propeller units will be rotated and the magnetic field from these magnetic units will induce eddy currents in the drag cup element 20 causing the element 20 to have a rotational force applied thereto. The force on the element 20 will be transmitted through the member 31 to the pivoted beam 30 and there will be a tendency for the beam 30 to move in accordance with the applied force. When the motion of the beam 30 is detected by the motion detector, the detector causes the output of the oscillator and amplifier 35 to change and produce a balancing force upon the beam 30 by way of the balancing coil 37. The current flowing in the leads 38 and 39 will then be directly proportional to the rate of flow of the fluid in the conduit 10. The current flow in the output leads 38 and 39 will also vary linearly with the flow of the fluid in the conduit 10. This current flow may be fed to any desired measuring or control apparatus. The instrument 40 connected in lead 39 may well serve as a current magnitude measuring means.

Figure 3:
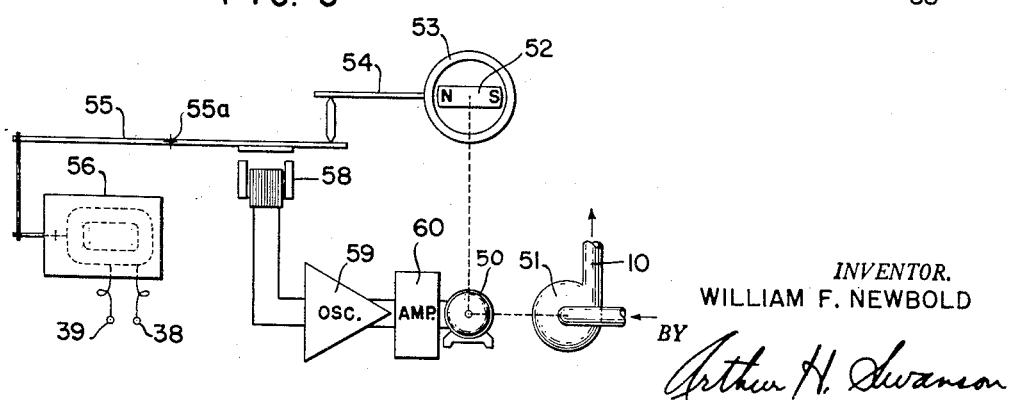
Fig. 3 shows a speed control mechanism which may be used to regulate the speed of a variable speed motor.

Referring to Fig. 3, there is shown a means for utilizing the output signal from the apparatus of Fig. 2 although it will be readily apparent that other means may be provided for supplying an input signal to the device. This figure shows a variable speed motor which is arranged to drive a pump which may supply the fluid to the conduit 10, as shown in Fig. 1.

The apparatus of Fig. 3 includes a variable speed motor 50 which drives a fluid pump 51. The motor 50 is also connected to drive a rotatable permanent magnet 52 which is associated with a drag cup 53. Fastened to the drag cup 53 is an output member 54 which produces a variable force upon a beam assembly 55 suitably pivoted at point 55A. The beam assembly 55 has as an additional force input the electromagnetic force producing member 56, the latter of which may take the same form as the device 36 shown in Fig. 2.

The motion of the beam 55 is detected by a suitable motion detector 58 which is used to regulate an oscillator and amplifier apparatus 59, the latter of which may also be of the type disclosed in the above mentioned Popowsky application. The output of the apparatus 59 connects to a motor speed regulating amplifier 60 which may be of any well known type.

In considering the operation of Fig. 3, it will be first assumed that the input leads to the force producing member 56 are supplied with a variable direct current signal which is effective to produce upon the beam 55, by way of the member 56, a variable force. The tendency for the beam to be displaced is detected by the motion detector 58 and oscillator and amplifier 59 which in turn will produce an output signal to control amplifier 60 to vary the speed of operation of the motor 50. The motor 50 will in turn drive the magnet 52 and produce a variable force on the drag cup 53. The force produced in the cup 53 will in turn be transmitted by way of the member 54 to the beam 55 to force-balance the beam.

It can thus be seen that the variable current flowing into the force producing unit 56 may be used to regulate the speed of operation of the motor 50 and that this speed regulating system is in effect a closed loop system wherein the drag cup 53 produces a balancing force upon the beam 55 so that it is possible to achieve an accurate proportional relationship between the motor 50 speed of operation and the current input signal on the input lines 38 and 39.

It will be readily apparent from the foregoing description that in the present invention there is provided a new and novel form of speed measuring and control apparatus which is adapted to have wide application in fields other than the specific fields disclosed above.

While, in accordance with the provisions of the statutes, there has been illustrated and described the best forms of the embodiment of the invention known, it will be apparent to those skilled in the art that changes may be made in the forms of the apparatus disclosed without departing from the spirit of the invention as set forth in the appended claims, and that in some cases certain features of the invention may be used to advantage without a corresponding use of other features.

Having now described the invention, what is claimed as new and for which it is desired to secure Letters Patent is:

1. Apparatus for measuring the rate of flow of fluid in a conduit comprising a fluid propelled rotary member positioned within the conduit, magnetic means carried by said member, a drag cup surrounding said conduit adjacent said member and adapted to have applied thereto a force proportional to the rate of rotation of said rotary member, a force transmitting member connected to said drag cup, a pivoted member positioned to have said force transmitting member apply a force thereto, means for detecting the motion of said pivoted member, and means including said last named means for applying a balancing force to said pivoted member.

2. Apparatus for measuring the rate of flow of fluid in a conduit comprising a fluid propelled rotary member positioned within the conduit, magnetic means carried by said member, a drag cup surrounding said conduit adjacent said member and adapted to have applied thereto a force proportional to the rate of rotation of said rotary member, a force transmitting member connected to said drag cup, motion sensing means positioned to respond to a displacement of said transmitting member, and means controlled by said motion sensing means connected to said transmitting member to apply a counter balancing force to said force transmitting member.

3. Apparatus for measuring the rate of flow of fluid in a conduit comprising a fluid propelled rotary member positioned within the conduit, magnetic means carried by said member, a drag cup surrounding said conduit adjacent said member and adapted to have applied thereto a force proportional to the rate of rotation of said rotary member, a force transmitting member connected to said drag cup, a pivoted member displaced by the force transmitted by said force transmitting member, electrical signal producing means, means responsive to the displacement of said pivoted member to control the output of said signal producing means, and means responsive to said signals of said signal producing means to produce a balancing force applied to said pivoted member in opposition to the force derived from said drag cup.

References Cited in the file of this patent

UNITED STATES PATENTS

| 1,766,579 | Woodson | June 24, 1930 |
| 2,529,481 | Brewer | Nov. 14, 1950 |
| 2,593,339 | Ostermann et al. | Apr. 15, 1952 |
| 2,731,025 | Neuman et al. | Jan. 17, 1956 |